United States Patent [19]

Sylvander

[11] 4,383,788
[45] May 17, 1983

[54] ARRANGEMENT FOR A MACHINE PARTICULARLY INTENDED FOR HANDLING LOOSE SIGNATURE PACKS

[75] Inventor: Thomas Sylvander, Månsarp, Sweden
[73] Assignee: Wamac-Idab AB, Sweden
[21] Appl. No.: 230,365
[22] Filed: Jan. 30, 1981
[30] Foreign Application Priority Data
Jan. 28, 1980 [SE] Sweden .................................. 8000667
[51] Int. Cl.³ .................................................. B65G 57/06
[52] U.S. Cl. ....................................... 414/71; 271/180;
414/84; 414/785; 414/744 A; 414/907
[58] Field of Search ........................ 414/31, 52, 57, 62,
414/63, 71, 82, 83, 84, 85, 704, 740, 785, 902,
907, 744 A; 271/177, 180, 192

[56] References Cited
U.S. PATENT DOCUMENTS

| | | | |
|---|---|---|---|
| 2,960,243 | 11/1960 | Beaulieu ............................... | 414/82 |
| 3,126,657 | 3/1964 | Hajos ............................... | 271/192 X |
| 3,164,080 | 1/1965 | Miller ............................... | 414/82 X |
| 3,416,686 | 12/1968 | Penrod ............................... | 414/785 |
| 3,884,363 | 5/1975 | Ajlouny ............................... | 414/71 X |
| 4,273,506 | 6/1981 | Thomson et al. ............ | 414/744 A X |

FOREIGN PATENT DOCUMENTS

| | | | |
|---|---|---|---|
| 2356133 | 6/1974 | Fed. Rep. of Germany . | |
| 54-58494 | 5/1979 | Japan .................................... | 271/192 |
| 1023760 | 3/1966 | United Kingdom ................... | 414/57 |

Primary Examiner—Leslie J. Paperner
Attorney, Agent, or Firm—Ostrolenk, Faber, Gerb & Soffen

[57] ABSTRACT

According to the invention, a machine is disclosed for handling and preferably loading loose signature packs onto a pallet. In a preferred embodiment, the machine comprises an industrial robot known per se, which has an arm movable in all planes. This arm is provided with a rotation device on which is mounted a gripping device incuding at least two horizontal, reciprocally movable carrying rods co-acting with a support plate and at least one vertical pressure plate movable toward and away from the carrying rods for gripping and conveying a pack of loose signatures from a conveyor and depositing them in a programmed pattern for building a load on a pallet.

18 Claims, 4 Drawing Figures

ARRANGEMENT FOR A MACHINE PARTICULARLY INTENDED FOR HANDLING LOOSE SIGNATURE PACKS

BACKGROUND OF THE INVENTION

The present invention relates to an arrangement for a machine which is to handle packs of newspapers, weekly journals and the like, hereinafter designated signatures, lying loosely one on top of the other, and particularly intended for loading such packs on a pallet in a predetermined pattern, tightly adjacent to and on top of each other.

Loading loose signature packs on a pallet has so far been done manually or with aid of complicated and expensive machines, and in the case of the latter the whole pallet has been moved into different positions as the packs have been deposited, until a desired number of pack layers or courses have been built up on the pallet. Since a loose pack of signatures is very difficult to handle during loading without the signatures being displaced relative to each other so that the sides of the pack become uneven, it is also common to bundle each pack in film, or to band the pack before loading it onto a pallet.

SUMMARY OF THE INVENTION

The present invention therefore is to provide an arrangement for a machine of the type mentioned in the introduction, by means of which positive deposition and course formation in the loading of signature packs on a pallet are ensured, and in which the drawbacks to be found with the machines and modes of procedure mentioned above are entirely eliminated. This is obtained with a machine of the kind in question which, in accordance with the invention, comprises an industrial robot known per se, with an arm which is swivelable, raisable and lowerable and which can carry out a reciprocating movement. The arm has at its free end a rotation unit on which a gripping means is mounted, the gripping means comprising a support plate with at least two carrying rods at a predetermined spacing apart. The rods are axially movable from an inner position to an outer position and vice versa. At least one pressure plate is disposed above the carrying rods, the pressure plate being vertically movable in a direction towards the rods and being adapted for pressing together and retaining the pack against the rods in their outer position, when moving a pack of signatures. The plate maintains its pressure against the upper side of the pack until the pack engages against the pallet or against a pack previously deposited thereon, when the pack is deposited to form part of the load on the pallet and after rapid withdrawal of the rods from the underside of the pack to their inner position.

By virtue of the invention there is now obtained a structure which admirably fulfils its objects, but which is simultaneously simple and cheap to manufacture. By means of the firm grip in which each signature pack is kept by the gripping means while being taken from a conveyor, e.g. a belt conveyor, for deposit on the pallet load being formed, the risk of mutual displacement of the newspapers is completely eliminated. At the instant of deposition itself, the relative mutual positions of the newspapers in the pack remain as desired, since the pressure plate accompanies and presses down the pack with a force exceeding that of gravity on the pack itself in the small drop occuring when the carrying rods are snatched back, whereby possible tipping or separation cannot occur. During removal of the gripping means, the pressure plate is pressed against the upper side of the pack until its piston rod has reached its furthermost extended position, at which the gripping means itself is moved upwards sufficiently far from the deposited pack so that there is no possibility of the pack catching when the gripping means swings away. The pressure plate then moves back to its completely retracted initial position. The air is pressed out of the signatures by the pressure plate pressing the pack against the carrying rods, friction between the signatures thus increased, which being further ensures that the pack remains intact during handling. As a result of the robot's programability, exact paths for the signature packs can be prescribed from picking up at the conveyor to deposition in the desired pattern on the load being built up on the pallet, without needing to move the pallet. Keeping the pallet stationary during palletization has been found to result in great economies in space and labor.

DETAILED DESCRIPTION OF THE PREFERRED EMBODIMENT

Figure 1:
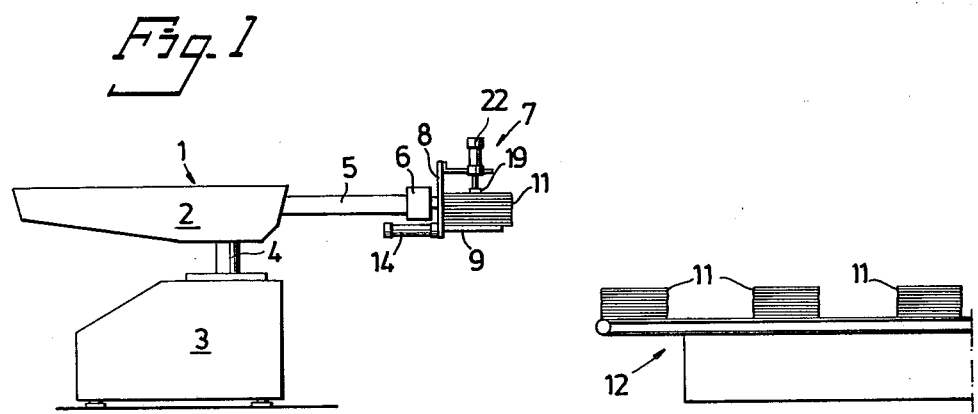
FIG. 1 is a schematic side view of the arrangement and machine in accordance with the invention.
Figure 2:
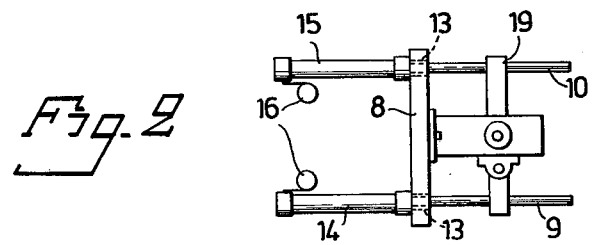
FIG. 2 illustrates on a larger scale a view from above of a preferred embodiment of the gripping means.

As will be seen from FIG. 1, the arrangement and machine in accordance with the invention comprises an industrial robot or an automatic control and manipulation unit 1 with a portion 2 which is swivelably, as well as raisably and lowerably attached to the body 3 of the robot 1 via a shaft structure 4. An arm 5 is extendably and retractably mounted in the portion 2. The robot 1, of known construction, is programable by means of a commercially available programming unit and memory unit, neither of which is illustrated in the drawing, whereby desired movement can be programmed directly into the memory unit in conjunction with manual maneuvering of the robot arm 5. At its free end, the arm 5 is provided with a rotation unit 6, on which a gripping means 7 is mounted. The gripping means 7 comprises a support plate 8, which at its lower end is provided with at least two carrying rods 9, 10, arranged parallel and at a predetermined spacing from each other, and intended to carry a signature pack 11, which is conveyed by a conveyer 12 to within the reach of the arm 5 with gripping means 7. The conveying element of the conveyor 12 can comprise a plurality of bands within the area the packs 11 arrive at before the lifting operation, to enable the insertion of the carrying rods 9, 10 under the respective pack 11. The carrying rods 9,10 preferably comprise hardened and ground steel shafts, for obtaining the low friction required to maintain the sheet of paper nearest the rods in undamaged condition when the rods 9,10 are snatched away. The rods 9,10 are mounted by means of mountings 13, e.g. ball bushings, in the support plate 8. In FIGS. 1, 2 and 4 the carrying rods 9,10 consist of the piston rods to compressed air cylinders 14, 15, which are mutually parallel and are attached to the lower edge of the support plate 8 on the side thereof facing towards the rotation unit 6. In their retracted position, the ends of carrying rods 9,10 are somewhat inside or are flush with the surface of the support plate 8 against which a side surface of a signature pack 11 is intended to bear (the right hand surface in FIGS. 1-3). The other, extended position of the carrying rods 9, 10 is variable in response to the shape of the pack 11 to be lifted. To enable rapid withdrawal of the carrying rods 9, 10 in conjunction with deposition of a pack 11, the cylinders 14, 15 for operating rods 9,10 are provided with rapid bleed air valves 16.

Figure 3:
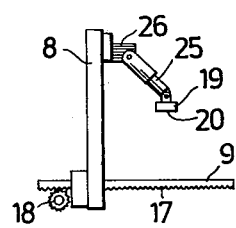
FIG. 3 illustrates on an enlarged scale another embodiment of the gripping means seen from one side.
Figure 4:
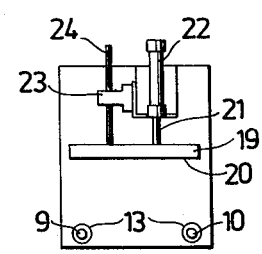
FIG. 4 is a view of the gripping means illustrated in FIG. 2, seen from the side from which a signature pack is gripped.

In the embodiment illustrated in FIG. 3, the carrying rods 9, 10 are made with teeth 17 to form a rack on their undersides. The teeth 17 co-act with a driven shaft 18 between the rotation unit 6 and support plate 8 for displacing the rods 9, 10 between their retracted and extended positions.

A pressure plate 19 is disposed above the carrying rods 9, 10 and spaced from the upper portion of the support plate 8 for movement in a direction substantially at right angles to the carrying rods 9, 10. The pressure plate 19 is provided with a friction plate 20 so as not to glide on the upper side of the signature pack 11. Air in the pack 11 which is to be handled is removed with the aid of compression from the pressure plate 19, so that friction between the signatures increases. In the embodiment illustrated in FIGS. 1, 2 and 4, the pressure plate is actuated by a piston rod 21 associated with a vertically adjustable compressed air cylinder 22, fixed to the upper portion of the support plate 8, the spacing between the piston rod 21 and the support plate 8 being adjustable to suit the shape of the signature packs 11 which are to be handled. The spacing of the piston rod center from the support plate 8 should preferably be 2/5 of the pack dimension at right angles to the support plate 8. Apart from the piston rod 21, the pressure plate 19 is supported or guided by a guide rod 24, glidable in a guiding bush 23 co-acting with the support means of the cylinder 22.

As will be seen from FIG. 3, the pressure plate 19 can also be pivotably attached to a telescopic swinging arm 25, which is unrotatably attached to a rotation motor 26 at the upper portion of the support plate 8, for providing the compressive force against a signature pack 11.

After the robot has been programmed with the desired motion pattern, the pallet loading machine functions in the following way: The gripping means 7 swings into position in front of a signature pack 11 in the outmost position on the conveyor 12 such that the carrying rods 9, 10, which are in the extended position, come under the pack. The end portion of the conveyor 12 and its conveying element are formed to allow the rods 9, 10 to come into position under the pack 11. The gripping means 7 is taken in towards the pack 11 such that the support plate 8 bears against the face of the pack 11 presented to it. The robot arm 5 subsequently moves upwards simultaneously as the pressure plate 19 presses the signatures forming the pack 11 against the carrying rods 9, 10. The arm 5 now swings into its programmed position above the place on the pallet load being built up, whereafter it sinks to a level just above the deposition surface thereon. The carrying rods 9, 10 are snatched away very quickly, causing the pack to fall down simultaneously as the pressure plate 19 guides it in an exact path by pressing against the pack 11 with a force greater than the normal gravitational acceleration of the pack 11, thus preventing the pack from tipping or separating. By means of the long stroke of the compression plate 19, relatively large variations in the level of the surface on which the pack 11 is to be deposited can be accommodated. The arm 5 then goes upwards with its gripping means 7 and the pressure plate 19 first releases its pressure on the pack 11 when in its furthermost extended position, whereby knocking against the deposited pack 11 during the removal of the gripping means 7 does not disturb the pack 11. When the pack 11 has come into place on the pallet, both its upper and lower signatures thereof are completely undamaged. The pressure plate 19 is first withdrawn to its uppermost retracted position when the gripping means 7 has moved a safe distance from the already deposited signature packs 11. The arm 5 with gripping means 7 then returns to the conveyor 12 to collect the next pack 11, and this is repeated the number of times which has been programmed in the memory, e.g. until the pallet is loaded to the desired height. In the depositifng operation, the packs are turned so that the spines of the signatures therein conform to a programmed pattern, ensuring that the load on the pallet doesn't disintegrate. The signals for the functions of the pressure plate and carrying rods are also programmed into the memory, whereby the machine can load a pallet to capacity completely automatically without any manual work needing to be performed.

I claim:
1. A machine for loading loose signature packs as onto a pallet in a predetermined pattern, said machine comprising:
   horizontally extending arm means for carrying unbanded signature packs from a predetermined pick-up point to a deposit point laterally displaced from said pick-up point, for deposit on a pallet, said arm means having a free end;
   gripping means rotatably disposed at said free end of said arm means for rotation about an axis extending lengthwise of said arm means; said gripping means comprising carrying means for carrying a pack of signatures, said carrying means being movable relative to said arm means between a retracted position in which said carrying means is unable to carry a load and an extended position in which said carrying means is available to carry a load of signatures; said carrying means being sufficiently quickly and suddenly movable from said extended to said retracted position to enable said carrying means to be suddenly withdrawn from under a load supported by it, without imparting to such load motion in the direction parallel to the retraction of said carrying means, and
   pressure means for exerting pressure on a load of signatures carried by said carrying means for pressing such signatures against said carrying means, and for pushing such signatures strongly downward onto a pallet when said arm means has brought such load of signatures to said deposit position and after said carrier means has been suddenly retracted to release such pack.
2. The machine of claim 1, wherein said carrying means comprises at least two parallel rods.
3. The machine of claim 2, wherein said parallel rods are movable axially between said retracted and said extended positions.
4. The machine of claim 2, wherein said rods are made of a low-friction material.
5. The machine of claim 2, wherein said carrying means comprises a respective air cylinder for each said rod, said rods being retractable into their respective said air cylinders for movement to said retracted position.

6. The machine of claim 5, further comprising a support plate disposed at said free end of said arm means and perpendicular to the direction of movement of said carrier means; said support plate having holes formed therein; said air cylinders extending from said support plate in one direction and said rods when in said extended position extending in the opposite direction from said support plate and passing through said holes therein.

7. The machine of claim 6, wherein said rods when in said retracted position are approximately flush with the surface of said support plate.

8. The machine of claim 2, wherein each said rod has one side for receiving a load of signatures and has another side opposite said one side formed with teeth; and further comprising gear means engaging said teeth of said rods and means for driving and gear means to drive said rods between said retracted and said extended positions.

9. The machine of claim 1, further comprising rotation means connecting said free end of said arm means and said gripping means to each other rotatably.

10. The machine of claim 1, wherein said gripping means further comprises a support plate disposed perpendicular to the direction of movement of said carrier means between said extended and said retracted position.

11. The machine of claim 10, further comprising rotation means connecting said gripping means rotatably to said free end of said arm means, said support plate being secured to said rotation means.

12. The machine of claim 1, wherein said pressure means comprises a pressure plate for pressing a load.

13. The machine of claim 12, wherein said pressure means further comprises a piston and an air cylinder for applying pressure via said pressure plate to a load.

14. The machine of claim 5, wherein each said air cylinder for said rods is provided with valve means for rapidly bleeding air from said air cylinder.

15. The machine of claim 12, wherein said pressure means further comprises a telescopic arm having said pressure plate secured to one end thereof, and means for powering said telescopic arm for applying pressure via said pressure plate to a load.

16. The machine of claim 1, wherein said carrier means is adjustable for varying said extended position thereof.

17. The machine of claim 16, wherein said pressure means is adjustable for varying the point at which it applies pressure to a load borne by said carrying means.

18. The machine of claim 1, wherein said pressure means is for applying pressure to a load borne by said carrier means at a point approximately two-fifths of the way from said free end of said carrier means when said carrier means is in said extended position.

* * * * *